United States Patent
Hunt et al.

(10) Patent No.: US 9,934,242 B2
(45) Date of Patent: Apr. 3, 2018

(54) REPLICATION OF DATA BETWEEN MIRRORED DATA SITES

(71) Applicant: Exablox Corporation, Sunnyvale, CA (US)

(72) Inventors: Tad Hunt, Sunnyvale, CA (US); John Howe, Saratoga, CA (US)

(73) Assignee: Exablox Corporation, Sunnyvale, CA (US)

( * ) Notice: Subject to any disclaimer, the term of this patent is extended or adjusted under 35 U.S.C. 154(b) by 631 days.

(21) Appl. No.: 13/939,106

(22) Filed: Jul. 10, 2013

(65) Prior Publication Data
US 2015/0019491 A1    Jan. 15, 2015

(51) Int. Cl.
| | | |
|---|---|---|
| G06F 7/00 | (2006.01) | |
| G06F 17/00 | (2006.01) | |
| G06F 17/30 | (2006.01) | |
| H04L 29/08 | (2006.01) | |
| G06F 11/14 | (2006.01) | |
| G06F 11/20 | (2006.01) | |

(52) U.S. Cl.
CPC .... G06F 17/30174 (2013.01); G06F 11/1443 (2013.01); G06F 11/2064 (2013.01); G06F 11/2079 (2013.01); G06F 11/2094 (2013.01); G06F 11/2097 (2013.01); G06F 17/30575 (2013.01); H04L 67/1095 (2013.01); G06F 2201/855 (2013.01)

(58) Field of Classification Search
None
See application file for complete search history.

(56) References Cited

U.S. PATENT DOCUMENTS

| | | |
|---|---|---|
| 4,656,604 A | 4/1987 | van Loon |
| 4,660,130 A | 4/1987 | Bartley et al. |
| 5,420,999 A | 5/1995 | Mundy |
| (Continued) | | |

FOREIGN PATENT DOCUMENTS

| | | |
|---|---|---|
| EP | 1285354 | 2/2003 |
| EP | 2575379 | 4/2013 |
| (Continued) | | |

OTHER PUBLICATIONS

International Search Report dated Apr. 2, 2015 Application No. PCT/US2014/045822.
(Continued)

*Primary Examiner* — David T Brooks
(74) *Attorney, Agent, or Firm* — Maschoff Brennan

(57) ABSTRACT

Computer-implemented methods and systems for replication of data between mirrored data sites are provided. An exemplary method may comprise receiving a data object at a mirrored data site, the mirrored data site including one or more data nodes. The data objects are replicated to the one or more data nodes internally. Then, a data object reference associated with the data object is generated. The reference referring to the data object is queued for transmission to all other mirrored data sites. The data object reference associated with the data object is transmitted to the other mirrored data sites. When the data object is received at each mirrored data site, it is replicated to one or more data nodes within the site. After transmitting the data object, the data object reference is discarded.

19 Claims, 10 Drawing Sheets

(56) References Cited

U.S. PATENT DOCUMENTS

| | | | |
|---|---|---|---|
| 5,561,778 A | 10/1996 | Fecteau et al. | |
| 5,812,793 A * | 9/1998 | Shakib | H04L 29/06 |
| | | | 707/999.008 |
| 5,950,205 A | 9/1999 | Aviani, Jr. | |
| 6,098,079 A | 8/2000 | Howard | |
| 6,154,747 A | 11/2000 | Hunt | |
| 6,167,437 A | 12/2000 | Stevens et al. | |
| 6,314,435 B1 | 11/2001 | Wollrath et al. | |
| 6,356,916 B1 | 3/2002 | Yamatari et al. | |
| 6,480,950 B1 | 11/2002 | Lyubashevskiy et al. | |
| 6,493,721 B1 * | 12/2002 | Getchius | G06Q 30/02 |
| 6,772,162 B2 | 8/2004 | Waldo et al. | |
| 6,839,823 B1 | 1/2005 | See et al. | |
| 7,043,494 B1 | 5/2006 | Joshi et al. | |
| 7,177,980 B2 | 2/2007 | Milillo et al. | |
| 7,197,622 B2 | 3/2007 | Torkelsson et al. | |
| 7,266,555 B1 | 9/2007 | Coates et al. | |
| 7,293,140 B2 | 11/2007 | Kano | |
| 7,392,421 B1 * | 6/2008 | Bloomstein | G06F 11/1482 |
| | | | 714/4.4 |
| 7,403,961 B1 | 7/2008 | Deepak et al. | |
| 7,454,592 B1 | 11/2008 | Shah et al. | |
| 7,509,360 B2 | 3/2009 | Wollrath et al. | |
| 7,539,836 B1 | 5/2009 | Klinkner | |
| 7,653,668 B1 * | 1/2010 | Shelat | G06F 11/2094 |
| | | | 707/610 |
| 7,685,109 B1 | 3/2010 | Ransil et al. | |
| 7,725,437 B2 | 5/2010 | Kirshenbaum et al. | |
| 7,827,218 B1 | 11/2010 | Mittal | |
| 7,895,666 B1 | 2/2011 | Eshghi et al. | |
| 7,990,979 B2 | 8/2011 | Lu et al. | |
| 8,019,882 B2 | 9/2011 | Rao et al. | |
| 8,099,605 B1 | 1/2012 | Billsrom et al. | |
| 8,132,168 B2 | 3/2012 | Wires et al. | |
| 8,239,584 B1 | 8/2012 | Rabe et al. | |
| 8,364,887 B2 | 1/2013 | Wong et al. | |
| 8,407,438 B1 | 3/2013 | Ranade | |
| 8,447,733 B2 | 5/2013 | Sudhakar | |
| 8,572,290 B1 | 10/2013 | Mukhopadhyay et al. | |
| 8,868,926 B2 | 10/2014 | Hunt et al. | |
| 9,009,202 B2 | 4/2015 | Patterson | |
| 9,043,567 B1 | 5/2015 | Modukuri et al. | |
| 2002/0069340 A1 | 6/2002 | Tindal et al. | |
| 2002/0087590 A1 | 7/2002 | Bacon et al. | |
| 2003/0028514 A1 | 2/2003 | Lord et al. | |
| 2003/0028585 A1 | 2/2003 | Yeager et al. | |
| 2003/0056139 A1 | 3/2003 | Murray et al. | |
| 2003/0072259 A1 | 4/2003 | Mor | |
| 2003/0101173 A1 | 5/2003 | Lanzatella et al. | |
| 2003/0115408 A1 | 6/2003 | Milillo et al. | |
| 2004/0093361 A1 | 5/2004 | Therrien et al. | |
| 2004/0111610 A1 | 6/2004 | Slick et al. | |
| 2004/0158588 A1 * | 8/2004 | Pruet, III | G06F 17/30578 |
| 2004/0167898 A1 | 8/2004 | Margolus et al. | |
| 2005/0071335 A1 | 3/2005 | Kadatch | |
| 2005/0080928 A1 | 4/2005 | Beverly et al. | |
| 2005/0081041 A1 | 4/2005 | Hwang | |
| 2005/0083759 A1 | 4/2005 | Wong et al. | |
| 2005/0138271 A1 | 6/2005 | Bernstein et al. | |
| 2005/0160170 A1 | 7/2005 | Schreter | |
| 2005/0256972 A1 * | 11/2005 | Cochran | H04L 69/329 |
| | | | 709/245 |
| 2006/0036648 A1 * | 2/2006 | Frey | G06F 3/0611 |
| 2006/0039371 A1 | 2/2006 | Castro et al. | |
| 2006/0083247 A1 | 4/2006 | Mehta | |
| 2006/0156396 A1 | 7/2006 | Hochfield et al. | |
| 2006/0168154 A1 * | 7/2006 | Zhang | G06F 11/1662 |
| | | | 709/220 |
| 2006/0271540 A1 | 11/2006 | Williams | |
| 2006/0271604 A1 | 11/2006 | Shoens | |
| 2007/0005746 A1 | 1/2007 | Roe et al. | |
| 2007/0130232 A1 | 6/2007 | Therrien et al. | |
| 2007/0203960 A1 | 8/2007 | Guo | |
| 2007/0230368 A1 | 10/2007 | Shi et al. | |
| 2007/0233828 A1 | 10/2007 | Gilbert | |
| 2007/0271303 A1 | 11/2007 | Menendez et al. | |
| 2007/0276838 A1 | 11/2007 | Abushanab et al. | |
| 2007/0276843 A1 | 11/2007 | Lillibridge et al. | |
| 2008/0005624 A1 * | 1/2008 | Kakivaya | H04L 67/104 |
| | | | 714/47.1 |
| 2008/0016507 A1 | 1/2008 | Thomas et al. | |
| 2008/0052446 A1 | 2/2008 | Lasser et al. | |
| 2008/0126434 A1 | 5/2008 | Uysal et al. | |
| 2008/0133893 A1 | 6/2008 | Glew | |
| 2008/0147872 A1 | 6/2008 | Regnier | |
| 2008/0170550 A1 | 7/2008 | Liu et al. | |
| 2008/0183973 A1 | 7/2008 | Aguilera et al. | |
| 2008/0243879 A1 | 10/2008 | Gokhale et al. | |
| 2008/0243938 A1 | 10/2008 | Kottomtharayil et al. | |
| 2008/0244199 A1 | 10/2008 | Nakamura et al. | |
| 2008/0292281 A1 | 11/2008 | Pecqueur et al. | |
| 2009/0049240 A1 | 2/2009 | Oe et al. | |
| 2009/0100212 A1 | 4/2009 | Boyd et al. | |
| 2009/0172139 A1 | 7/2009 | Wong et al. | |
| 2009/0198927 A1 | 8/2009 | Bondurant et al. | |
| 2009/0199041 A1 | 8/2009 | Fukui et al. | |
| 2009/0282125 A1 * | 11/2009 | Jeide | H04L 67/1095 |
| | | | 709/217 |
| 2009/0307292 A1 | 12/2009 | Li et al. | |
| 2009/0327312 A1 | 12/2009 | Kakivaya et al. | |
| 2010/0023941 A1 | 1/2010 | Iwamatsu et al. | |
| 2010/0031000 A1 | 2/2010 | Flynn et al. | |
| 2010/0036862 A1 | 2/2010 | Das et al. | |
| 2010/0114336 A1 | 5/2010 | Konieczny et al. | |
| 2010/0114905 A1 | 5/2010 | Slavik et al. | |
| 2010/0122330 A1 | 5/2010 | McMillan et al. | |
| 2010/0161817 A1 | 6/2010 | Xiao et al. | |
| 2010/0172180 A1 | 7/2010 | Paley et al. | |
| 2010/0191783 A1 | 7/2010 | Mason et al. | |
| 2010/0217953 A1 | 8/2010 | Beaman et al. | |
| 2010/0228798 A1 | 9/2010 | Kodama et al. | |
| 2010/0262797 A1 | 10/2010 | Rosikiewicz et al. | |
| 2010/0318645 A1 | 12/2010 | Hoole et al. | |
| 2010/0332456 A1 | 12/2010 | Prahlad et al. | |
| 2011/0026439 A1 | 2/2011 | Rollins | |
| 2011/0029711 A1 | 2/2011 | Dhuse et al. | |
| 2011/0034176 A1 | 2/2011 | Lord et al. | |
| 2011/0060918 A1 | 3/2011 | Troncoso Pastoriza et al. | |
| 2011/0106795 A1 | 5/2011 | Maim | |
| 2011/0138123 A1 | 6/2011 | Gurajada et al. | |
| 2011/0213754 A1 | 9/2011 | Bindal et al. | |
| 2011/0231374 A1 | 9/2011 | Jain et al. | |
| 2011/0231524 A1 | 9/2011 | Lin et al. | |
| 2011/0264712 A1 | 10/2011 | Ylonen | |
| 2011/0264989 A1 | 10/2011 | Resch et al. | |
| 2011/0271007 A1 | 11/2011 | Wang et al. | |
| 2012/0011337 A1 | 1/2012 | Aizman | |
| 2012/0030260 A1 | 2/2012 | Lu et al. | |
| 2012/0030408 A1 | 2/2012 | Flynn et al. | |
| 2012/0047181 A1 | 2/2012 | Baudel | |
| 2012/0060072 A1 | 3/2012 | Simitci et al. | |
| 2012/0078915 A1 | 3/2012 | Darcy | |
| 2012/0096217 A1 | 4/2012 | Son et al. | |
| 2012/0147937 A1 | 6/2012 | Goss et al. | |
| 2012/0173790 A1 | 7/2012 | Hetzler et al. | |
| 2012/0179808 A1 | 7/2012 | Bergkvist et al. | |
| 2012/0179820 A1 | 7/2012 | Ringdahl et al. | |
| 2012/0185555 A1 | 7/2012 | Regni et al. | |
| 2012/0210095 A1 | 8/2012 | Nellans et al. | |
| 2012/0233251 A1 | 9/2012 | Holt et al. | |
| 2012/0278511 A1 | 11/2012 | Alatorre et al. | |
| 2012/0290535 A1 | 11/2012 | Patel et al. | |
| 2012/0290629 A1 | 11/2012 | Beaverson et al. | |
| 2012/0310892 A1 * | 12/2012 | Dam | G06F 17/30156 |
| | | | 707/659 |
| 2012/0323850 A1 * | 12/2012 | Hildebrand | G06F 17/30578 |
| | | | 707/624 |
| 2012/0331528 A1 | 12/2012 | Fu et al. | |
| 2013/0013571 A1 | 1/2013 | Sorenson, III et al. | |
| 2013/0041931 A1 | 2/2013 | Brand | |
| 2013/0054924 A1 | 2/2013 | Dudgeon et al. | |
| 2013/0067270 A1 | 3/2013 | Lee et al. | |
| 2013/0073821 A1 | 3/2013 | Flynn et al. | |

(56) References Cited

U.S. PATENT DOCUMENTS

| | | | |
|---|---|---|---|
| 2013/0086004 | A1 | 4/2013 | Chao et al. |
| 2013/0091180 | A1 | 4/2013 | Vicat-Blanc-Primet et al. |
| 2013/0162160 | A1 | 6/2013 | Ganton et al. |
| 2013/0166818 | A1 | 6/2013 | Sela |
| 2013/0185508 | A1 | 7/2013 | Talagala et al. |
| 2013/0232313 | A1* | 9/2013 | Patel ............... G06F 11/2094 711/162 |
| 2013/0235192 | A1 | 9/2013 | Quinn et al. |
| 2013/0246589 | A1 | 9/2013 | Klemba et al. |
| 2013/0262638 | A1 | 10/2013 | Kumarasamy et al. |
| 2013/0263151 | A1 | 10/2013 | Li et al. |
| 2013/0268644 | A1 | 10/2013 | Hardin et al. |
| 2013/0268770 | A1 | 10/2013 | Hunt et al. |
| 2013/0282798 | A1 | 10/2013 | McCarthy et al. |
| 2013/0288668 | A1 | 10/2013 | Pragada et al. |
| 2013/0311574 | A1 | 11/2013 | Lal |
| 2013/0346591 | A1 | 12/2013 | Carroll et al. |
| 2013/0346839 | A1 | 12/2013 | Dinha |
| 2014/0006580 | A1 | 1/2014 | Raghu |
| 2014/0007178 | A1 | 1/2014 | Gillum et al. |
| 2014/0019573 | A1* | 1/2014 | Swift ............... H04L 67/1095 709/212 |
| 2014/0059405 | A1 | 2/2014 | Syu et al. |
| 2014/0143206 | A1 | 5/2014 | Pittelko |
| 2014/0297604 | A1 | 10/2014 | Brand |
| 2014/0317065 | A1 | 10/2014 | Barrus |
| 2014/0324945 | A1* | 10/2014 | Novak ............... G06F 17/30153 709/203 |
| 2014/0335480 | A1 | 11/2014 | Asenjo et al. |
| 2014/0351419 | A1 | 11/2014 | Hunt et al. |
| 2014/0372490 | A1 | 12/2014 | Barrus et al. |
| 2014/0379671 | A1 | 12/2014 | Barrus et al. |
| 2015/0012763 | A1 | 1/2015 | Cohen et al. |
| 2015/0066524 | A1 | 3/2015 | Fairbrothers et al. |
| 2015/0081964 | A1 | 3/2015 | Kihara et al. |
| 2015/0106335 | A1 | 4/2015 | Hunt et al. |
| 2015/0106579 | A1 | 4/2015 | Barrus |
| 2015/0172114 | A1 | 6/2015 | Tarlano et al. |
| 2015/0220578 | A1 | 8/2015 | Hunt et al. |
| 2015/0222616 | A1 | 8/2015 | Tarlano et al. |

FOREIGN PATENT DOCUMENTS

| | | |
|---|---|---|
| EP | 2834749 | 2/2015 |
| EP | 2834943 | 2/2015 |
| EP | 2989549 A1 | 3/2016 |
| EP | 3000205 A1 | 3/2016 |
| EP | 3000289 A2 | 3/2016 |
| EP | 3008647 A1 | 4/2016 |
| EP | 3011428 A1 | 4/2016 |
| EP | 3019960 | 5/2016 |
| EP | 3020259 | 5/2016 |
| EP | 3055794 | 8/2016 |
| EP | 3058466 | 8/2016 |
| JP | 2004252663 A | 9/2004 |
| JP | 2008533570 A | 8/2008 |
| JP | 2010146067 A | 7/2010 |
| JP | 2011095976 A | 5/2011 |
| JP | 2012048424 A | 3/2012 |
| WO | WO2013152357 | 10/2013 |
| WO | WO2013152358 | 10/2013 |
| WO | WO2014176264 | 10/2014 |
| WO | WO2014190093 | 11/2014 |
| WO | WO2014201270 | 12/2014 |
| WO | WO2014205286 | 12/2014 |
| WO | WO2015006371 | 1/2015 |
| WO | WO2015054664 A1 | 4/2015 |
| WO | WO2015057576 A1 | 4/2015 |
| WO | WO2015088761 A1 | 6/2015 |
| WO | WO2015116863 A1 | 8/2015 |
| WO | WO2015120071 A2 | 8/2015 |

OTHER PUBLICATIONS

International Sesarch Report dated May 14, 2015 Application No. PCT/US2015/013611.
International Sesarch Report dated May 15, 2015 Application No. PCT/US2015/014492.
Invitation pursuant to Rule 63(1) dated May 19, 2015 Application No. 13772293.0.
International Search Report dated Aug. 6, 2013 Application No. PCT/US2013/035675.
Huck et al. Architectural Support for Translation Table Management in Large Address Space Machines. ISCA '93 Proceedings of the 20th Annual International Symposium on Computer Architecture, vol. 21, No. 2. May 1993. pp. 39-50.
International Search Report dated Aug. 2, 2013 Application No. PCT/US2013/035673.
International Search Report dated Sep. 10, 2014 Application No. PCT/US2014/035008.
Askitis, Nikolas et al., "HAT-trie: A Cache-conscious Trie-based Data Structure for Strings".
International Search Report dated Sep. 24, 2014 Application No. PCT/US2014/039036.
International Search Report dated Oct. 22, 2014 Application No. PCT/US2014/043283.
International Search Report dated Nov. 7, 2014 Application No. PCT/US2014/042155.
International Search Report dated Jan. 1, 2015 Application No. PCT/US2014/060176.
International Search Report dated Feb. 24, 2015 Application No. PCT/US2014/060280.
International Search Report dated Mar. 4, 2015 Application No. PCT/US2014/067110.
Office Action, dated Nov. 5, 2013, U.S. Appl. No. 13/441,715, filed Apr. 6, 2012.
Notice of Allowance, dated Mar. 27, 2014, U.S. Appl. No. 13/441,715, filed Apr. 6, 2012.
Office Action, dated Nov. 13, 2013, U.S. Appl. No. 13/441,592, filed Apr. 6, 2012.
Office Action, dated May 19, 2014, U.S. Appl. No. 13/441,592, filed Apr. 6, 2012.
Final Office Action, dated Nov. 20, 2014, U.S. Appl. No. 13/441,592, filed Apr. 6, 2012.
Advisory Action, dated Feb. 19, 2015, U.S. Appl. No. 13/441,592, filed Apr. 6, 2012.
Extended European Search Report dated Aug. 4, 2015 Application No. 13771965.4.
Dabek et al. "Wide-area cooperative storage with CFS", Proceedings of the ACM Symposium on Operating Systems Principles, Oct. 1 , 2001. pp. 202-215.
Stoica et al. "Chord: A Scalable Peer-to-peer Lookup Service for Internet Applications", Computer Communication Review, ACM, New York, NY, US, vol. 31, No. 4, Oct. 1 , 2001. pp. 149-160.
Extended European Search Report dated Aug. 20, 2015 Application No. 13772293.0.
Office Action dated Mar. 15, 2016 in Japanese Patent Application No. 2015-504769 filed Apr. 8, 2013.
Joao, Jose et al., "Flexible Reference-Counting-Based Hardware Acceleration for Garbage Collection," Jun. 2009, ISCA '09: Proceedings of the 36th annual internaltional symposium on Computer Architecture, pp. 418-428.
Office Action dated Mar. 29, 2016 in Japanese Patent Application No. 2015-504768 filed Apr. 8, 2013, pp. 1-16.
Notice of Allowance dated Jul. 26, 2016 for Japanese Patent Application No. 2015-504768 filed Apr. 8, 2013, pp. 1-4.
Office Action, dated May 17, 2016, U.S. Appl. No. 14/303,329, filed Jun. 12, 2014.
Final Office Action, dated Jun. 1, 2016, U.S. Appl. No. 14/284,351, filed May 21, 2014.
Final Office Action, dated Jun. 1, 2016, U.S. Appl. No. 14/171,651, filed Feb. 3, 2014.
Notice of Allowance, dated Jul. 14, 2016, U.S. Appl. No. 14/303,329, filed Jun. 12, 2014.
Non-Final Office Action, dated Jul. 25, 2016, U.S. Appl. No. 14/309,796, filed Jun. 19, 2014.

(56) References Cited

OTHER PUBLICATIONS

Final Office Action, dated Aug. 9, 2016, U.S. Appl. No. 14/105,099, filed Dec. 12, 2013.
Non-Final Office Action, dated Aug. 23, 2016, U.S. Appl. No. 14/055,662, filed Oct. 16, 2013.
Notice of Allowance, dated Aug. 24, 2016, U.S. Appl. No. 14/257,905, filed Apr. 21, 2014.

* cited by examiner

REPLICATION OF DATA BETWEEN MIRRORED DATA SITES

TECHNICAL FIELD

This disclosure relates generally to systems and methods for data replication, and more specifically to replication infrastructures including mirrored data sites to provide a single consistent view of the file system available from any site.

DESCRIPTION OF RELATED ART

The approaches described in this section could be pursued but are not necessarily approaches that have been previously conceived or pursued. Therefore, unless otherwise indicated, it should not be assumed that any of the approaches described in this section qualify as prior art merely by virtue of their inclusion in this section.

In computing systems, remote replication is a form of data protection that involves copying of data between multiple sites to improve data protection, fault tolerance and to provide disaster recovery. As used herein, a term "site" may refer to physically distinct geographic locations, or it may refer to distinct groupings that require failure handling. For example, protection from earthquakes could mean placing replicas in sites that are not affected by the same fault lines. If the protection is directed against power-related failures, the two sites may be in the same building or perhaps even in the same rack, but each site would have different power sources.

Procedures used for data protection with a single site and procedures used for replication between different sites may differ substantially. Therefore, in conventional systems, two entirely different methodologies may be used.

Furthermore, replication of data objects between sites may suffer from various network and node failures. Such failures need to be detected and recovered from.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In accordance with various embodiments of the disclosure, a method for replication between mirroring sites is provided. In some embodiments, the method may include replicating a content addressable object store between multiple sites, where each object is addressable by a signature that is derived from the object data. In some embodiments, the method may include replicating a file system that is constructed on top of a content addressable object store.

The mirroring may be bi-directional such that changes to the data at any site are copied to all other sites, and all sites may simultaneously access the data according to the procedures available for the file system.

Additionally, the method may include guaranteeing, across the set of replicated sites, the read and write ordering and locking guarantees that the file system is required to deliver to its clients. In some embodiments, these ordering rules may be defined by various standards or protocols. Examples of such standards and protocols include POSIX, NFS, CIFS, SMB, RESTful, WebDav, and so forth.

Each mirrored site may include one or more nodes, one of which may be elected as a gateway. In some embodiments, gateway nodes may cooperate to elect one site as an arbitrator. Alternatively, the gateways may cooperatively share this responsibility. The arbitrator guarantees that all file system ordering rules are adhered to.

Sites may be added to a mirror or removed from it. An added site may already contain data objects. In some embodiments, these data objects may be replicated using an "initial synchronization" method. The initial synchronization method may be also used whenever sites are reconnected after a disconnection (for example, due to a network failure).

Using the method described herein, data objects of a mirrored site may be accessed, created, modified, or changed by other sites while the mirrored site is disconnected. For this purpose, a data object may be received at one site. Then, the data object may be stored on one or more nodes at that site. Furthermore, the data object may be forwarded to the gateway. For some data objects, the gateway may synchronously replicate the data object and metadata to the mirrored sites. For other data objects the gateway may synchronously send the data object signature and object metadata to the mirrored sites. The data object may be queued for asynchronous transmission. In some embodiments, the metadata may include a site identifier.

When a client at a mirrored site requires access to a data object that has not yet been replicated, that mirrored site sends a request for the data object to the site identified by the object metadata previously transmitted. The requested site may then send the object data to the requesting site and remove it from the queue of objects pending transmission.

In some embodiments, the queue of objects to be asynchronously replicated may be restricted to a maximum count of data objects. Thus, when the queue has reached its maximum, the site may stop accepting new data objects.

To the accomplishment of the foregoing and related ends, the one or more embodiment of the disclosures may comprise the features hereinafter fully described and particularly pointed out in the claims. The following description and the drawings set forth in detail certain illustrative features of the one or more embodiment of the disclosures. These features are indicative, however, of but a few of the various ways in which the principles of various embodiments of the disclosures may be employed, and this description is intended to include all such embodiment of the disclosures and their equivalents.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

The approaches and principles disclosed herein relate to computer-implemented methods and systems for replication of data objects within a computer network infrastructure. The computer network infrastructure includes a plurality of nodes each having storage resources for storing various data objects and enabling access to them from other nodes. Moreover, the storage resources of a single node may include one or a plurality of hard drives or other memory devices such as RAM (random-access memory), ROM (read-only memory), hard disk drive (HDD), or solid state drive (SSD). Each data object (e.g., a file, a collection of files, or any other entity which can be manipulated by an operating system or an application) may be replicated to each of the nodes in the infrastructure.

Logical connections between devices may form various topologies. The topology may depend on the layout of physical network, a number of devices in the network, and other factors. One conventional topology includes a site where data nodes are connected in a circle and each data node is connected to the neighboring data nodes. Another conventional topology includes a "mesh" topology where every data node is connected to every other data node in the site. Such site can be referred to as a "ring." Rings may be connected in a mesh, using point-to-point communications channels between each pair of nodes. Data nodes are said to be connected in a mesh when two or more rings are connected together and every pair of nodes in each ring are connected using point-to-point communications channels. Thus, if a ring contains 3 nodes, A, B, and C, there will be 3 network connections: A-B, B-C, and C-A. If there is a mesh with one member ring containing 2 nodes, A, B, and the other containing 3 nodes, D, E, F, then we have the following 10 network connections: A-B, D-E, E-F, F-D, A-D, A-E, A-F, B-D, B-E, and B-F.

In more complex designs, both of the described topologies may be used. For example, data sites may communicate with each other using a mesh connection. With this connection, every node in a data site can replicate data to every node in another data site. Thus, a mesh topology can exist between the data sites. This topology is illustrated by FIG. 1.

Figure 1:
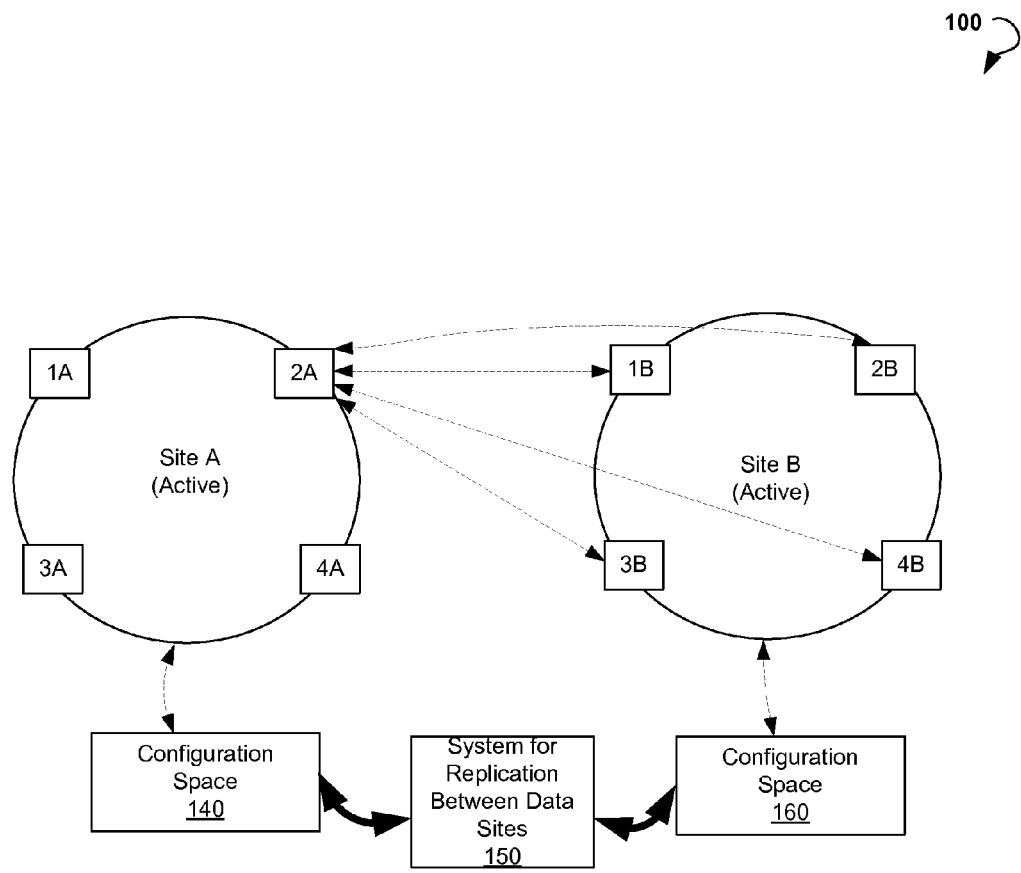
FIG. 1 shows a simplified structure of a computer network infrastructure.

FIG. 1 is a simplified structure of a computer network infrastructure 100, in accordance with some example embodiments. The computer network infrastructure 100 includes at least two sites, site A and site B, both of which are active. Each site may include a plurality of nodes. Each node is a network device (which may include further component data components) that maintains a network address and can store and share data objects. In an example, the node may refer to a device having a plurality of hard drives, a computer, a server, a laptop, a tablet computer, a thin client, or any other electronic computing device suitable for replicating data. Furthermore, each node may include multiple storage resources such as RAM, ROM, flash memory, and the like.

As shown in FIG. 1, site A may include four nodes: 1A, 2A, 3A, and 4A. Site B may also include four nodes: 1B, 2B, 3B, and 4B. Logical connections between site A and site B may form a mesh topology. Thus, each node of site A may replicate data to each node of site B. This is illustrated by the example of node 2A. Communications associated with node 2A are shown by arrows leading to each node of site B. Although such communications are shown only for node 2A, all nodes of the site A may have similar communications with all nodes of site B.

Site A may be associated with a configuration space 140, while site B may be associated with a configuration space 160. Configuration spaces 140 and 160 of the sites A and B in the mirror may be coordinated by a system for replication between data sites 150. The system 150 may coordinate configuration of sites A and B connected in the mesh to provide a single common view of a file system.

Replication of data between mirroring data sites may employ both synchronous and asynchronous data paths. Synchronous data paths may be used for metadata communication, while asynchronous paths may be used to transmit data itself. This approach is illustrated in FIG. 1.

In a multi-site infrastructure, one site may control replication and operate a Metadata Operational Processor (MOP). This site may be referred to as a master site and may be used to control metadata and resolve conflicts. Other sites may each operate a MOP proxy. These sites may be referred to as subservient sites.

Figure 2:
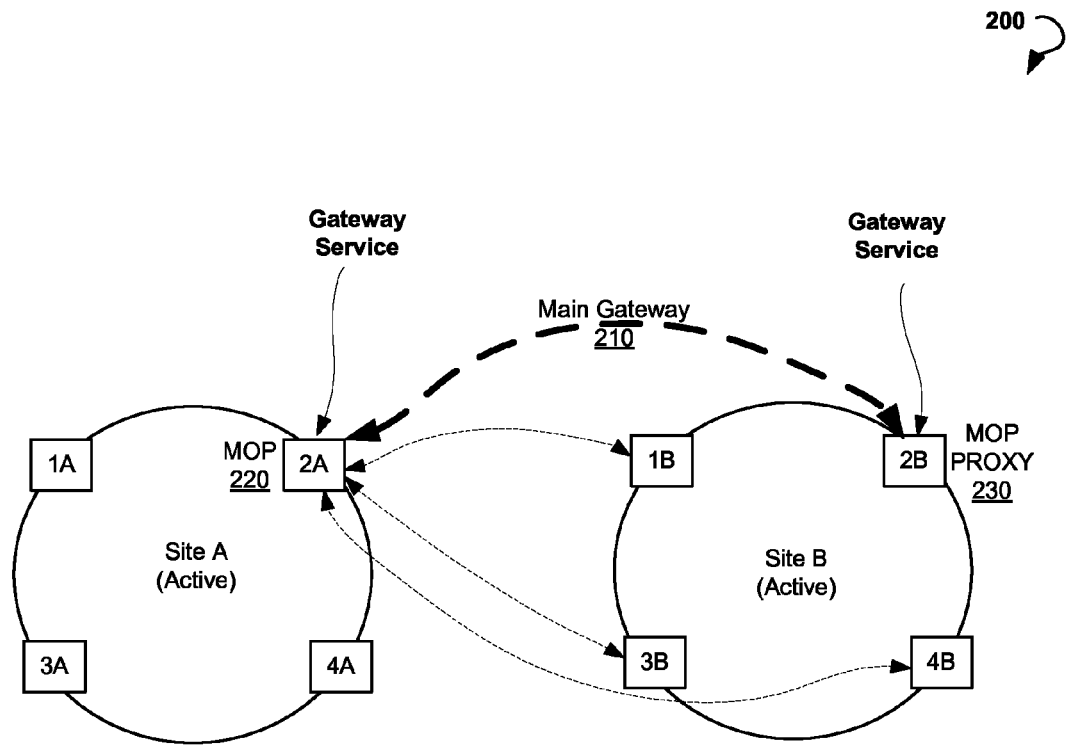
FIG. 2 shows a simplified scenario for migration of Metadata Operational Processor (MOP) and gateway services.

FIG. 2 illustrates a simplified structure of a computer network infrastructure 200, in accordance with some example embodiments. The computer network infrastructure 200 may include site A and site B, each having 4 nodes and connected in a mesh. In site A, node 2A may include MOP 220. Therefore, node 2A may be referred to as an arbitrator node and arbitrate data replications between the mirrored data site A and mirrored data site B. MOP 220 may synchronize all metadata operations in order to present a consistent view of the file system. Metadata operations from multiple nodes may be funneled through the MOP 220. MOP 220 may run on a single node within a site, but the node on which MOP 220 runs, may change depending on the state of the site and the data model. In some embodiments, the MOP functionality may be distributed across the nodes in the site, or between sites.

A site B not hosting MOP 220 may run a MOP proxy 230. The MOP proxy 230 may receive requests from nodes of the site B, just as MOP 220 receives requests from site A. However, by acting as a proxy, MOP proxy 230 may relay requests to MOP 220, in site A, and relay responses back to the nodes initiating the request. The MOP proxy 230 may act as a forwarding agent and relay remote procedure calls (RPC) between nodes of site B and the node running the MOP 220 in the site A.

Site A and site B may be connected using a bidirectional connection between the nodes in each site. This connection may be called a main gateway 210. The main gateway 210 may leverage a distributed messaging protocol for connection and events. The main gateway 210 may operate over a Local Area Network (LAN) or a Wide Area Network (WAN).

Figure 3:
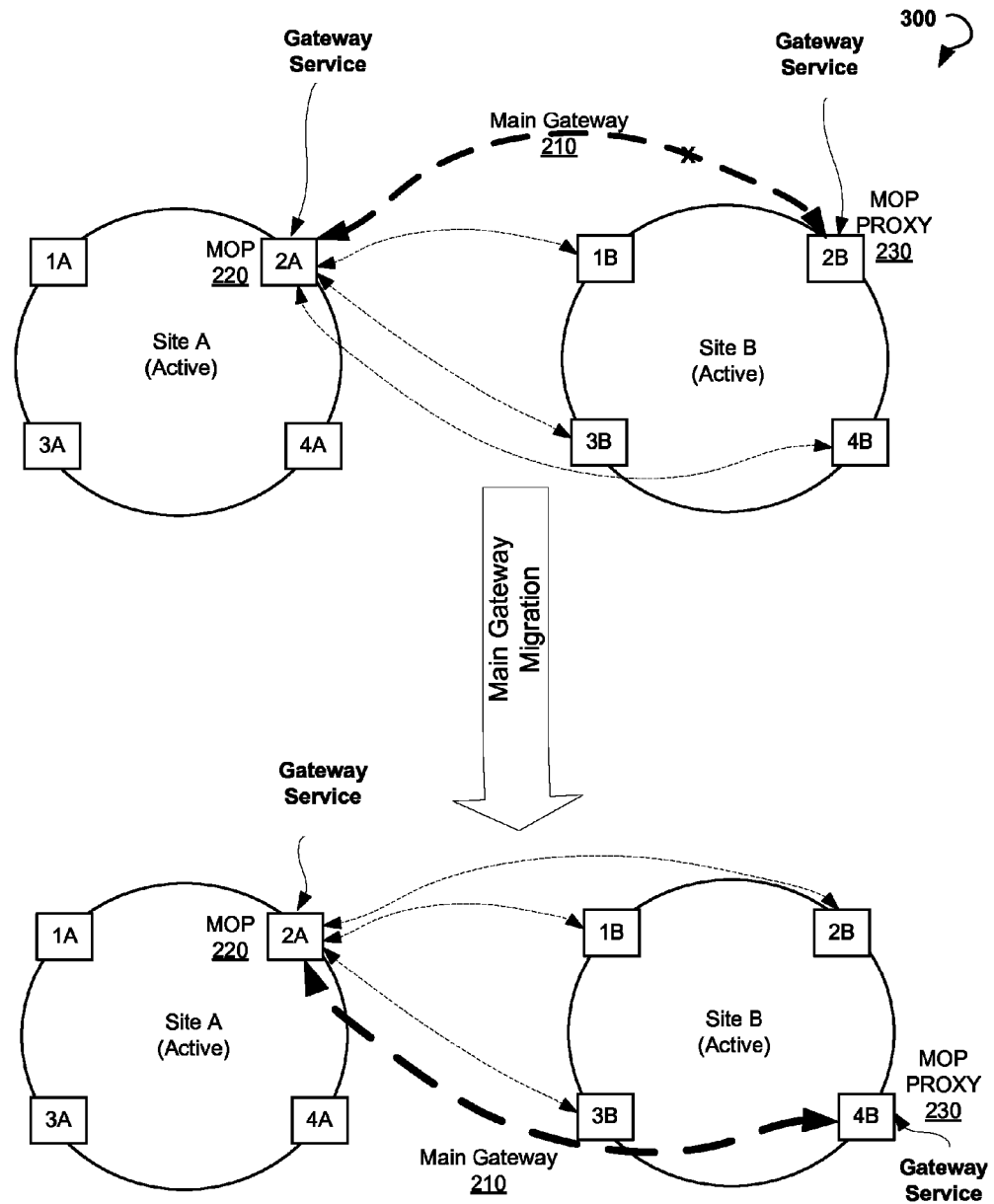
FIG. 3 shows a scenario for migration of a main gateway.

Referring now to FIG. 3, the main gateway 210 and MOP services may be collocated. MOP 220 may be located in node 2A of site A with gateway services, whereas MOP proxy 230 is located in node 2B together with gateway services. Since any node in the site A may be selected to run the MOP 220, and since any node in a site B may be selected to run the MOP proxy 230, all nodes may be provisioned ahead of time so that they connect to each node in the other site.

This may accommodate the node failover scenario in which a node 2A hosting the MOP 220 (or MOP proxy 230) fails over to another node in the site. The gateway service may follow the MOP 220 in a node failover. This may be performed using a pre-provisioned path to establish an alternate gateway between the mirrored sites. The state of the connections may be used to limit the possible MOP and gateway failover locations.

MOP proxy 230 that is associated with node 2B may migrate to another node of site B (for example, node 4B). This may be a result of a failure of the main gateway 210. Because the main gateway 210 and MOP services are co-located, the main gateway 210 may also migrate to node 4B.

Connection States

Figure 4:
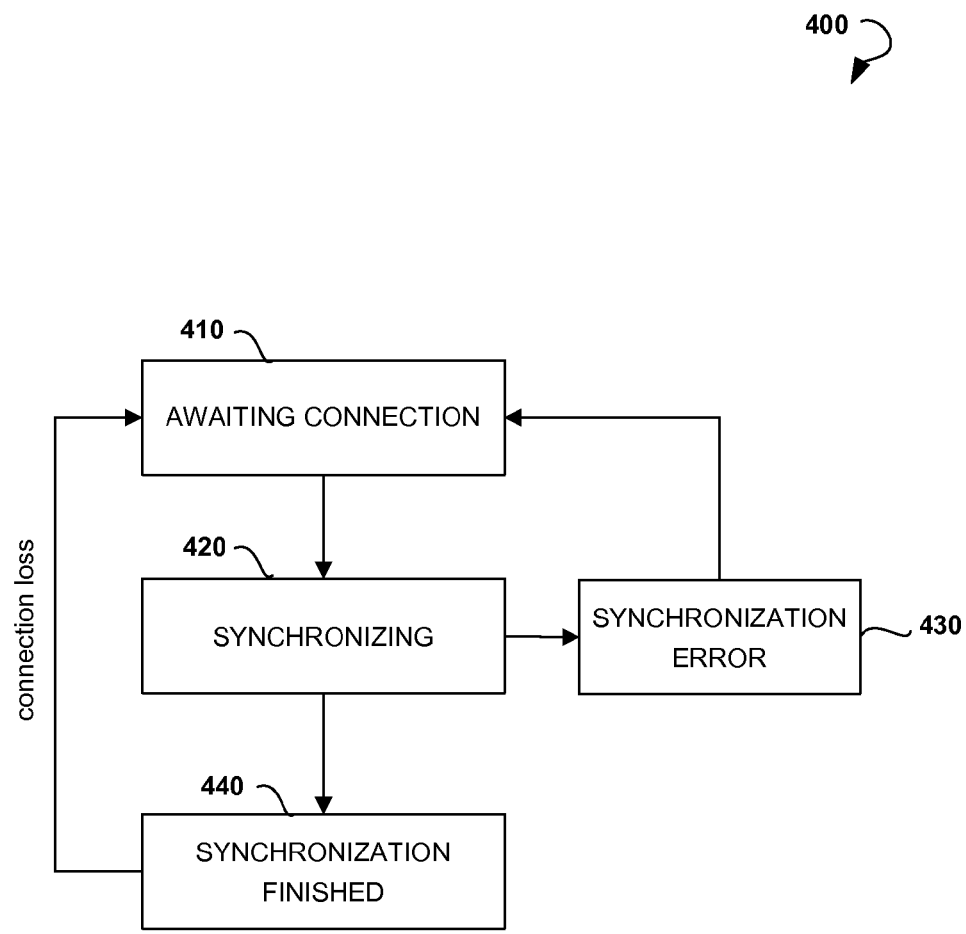
FIG. 4 shows a graphical representation of connection states of a gateway service in another site.

FIG. 4 shows a graphical representation of connection states 400 of a site awaiting connection from another site. Nodes in another site may initiate connections according to the mirror configuration published in a configuration space of each site.

Thus, connection states of a site may include awaiting connection 410, which may be initiated by nodes in another site. When connection is established, synchronizing 420 between the sites may start. The synchronizing may continue until either a synchronization error occurs 430 or the synchronization finishes 440. When either of the states 430 or 440 occurs, connection between sites no longer exists, and the site may go to the state 410 again and try to restore connection 410 and continue synchronizing 420 until the synchronization is finished 440.

Initial Synchronization

When sites connect or reconnect, the gateway service enters a phase called initial synchronization. The gateway services in each site may exchange object identifiers of objects known to exist on their respective sites. Object identifiers corresponding to objects unknown to the site may be pulled by the gateway service using a data receive operation, then written to the site using a data transfer operation. These operations may allow the gateway service to perform the initial synchronization of objects with more efficient use of the network link.

In some embodiments, status keys related to initial synchronization may be published in the configuration space, since initial synchronization is a long term operation. In such a way, the progress of the initial synchronization may be monitored.

When a mirror is connected, file system updates made on one site may be relayed to the other site. At the object level, this may be achieved by echoing updates made locally in one site to the other site.

Tier Architecture

Figure 5:
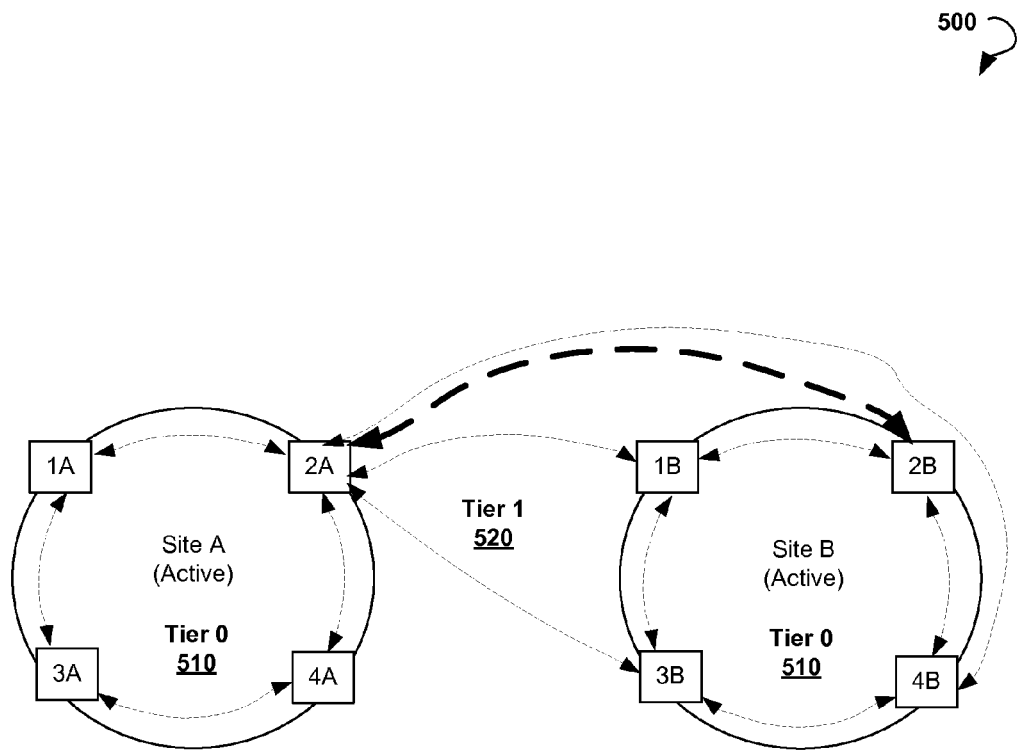
FIG. 5 shows data replication using different tiers.

Data objects may be replicated between nodes within a site and between the sites. Intra-site and inter-site operations may be performed at different levels or tiers as shown by FIG. 5.

Updates may be persisted on site A locally via tier 0 510 (or local tier). Correspondingly, intra-site operations, such as operations between nodes 1A and 2A, 1A and 3A, 3A and 4A, and 2A and 4A may be performed at tier 0 510.

Updates may then be pushed to site B via tier 1 520 (or remote tier). Operations within site B, i.e., 1B and 2B, 1B and 3B, 3B and 4B, and 2B and 4B, may then also be performed at tier 0 510.

By associating intra-site and inter-site operations with different tiers, looping of operations may be avoided. For example, a data object write may be replicated to all of the tiers in a list at the originating site. One of those tiers may contain a gateway to another site, which causes the data object to be replicated to that site. Within that site, a new list of tiers to store the data object may be generated, and the originating tier may be eliminated from the list in order to avoid the gateway on this end looping the data object back to the originating end.

In accordance to some embodiments, before a generic update operation completes successfully, it must successfully complete on all tiers.

Since the mirror connection may have slow WAN-like performance with high latencies, an update between sites may start with forming a data reference informing the other site about data objects that will be transferred. For example, an RPC may be handled by the gateway service on the other site, at which point an entry may be made in a proxy object database, called DB_MB. Such an entry may indicate a promise by the other site that an object corresponding to this entry will eventually arrive. The object transfer may be then queued on the node initiating the request for eventual delivery to the other site.

In some example embodiments, a configurable queue length maximum may be enforced. When the limit is reached, an alarm may be triggered, and the original operation will not complete until the queue can be appended.

In other example embodiments, when the queue limit is reached, backpressure may be applied to the clients, such that new writes are not accepted. Via this and similar schemes, the differences between the mirrors may be minimized and bounded in time.

To support a read, an object receive may be performed only after an object is not seen within any previous tier. In order to support a consistent file system view, if the requested object corresponds to an entry in the local proxy object database, then a tier 0 read operation may be performed in the other site via the gateway service node in each site. Meanwhile, the corresponding data object may not get persisted in that site until the write operation is eventually de-queued and processed successfully. Upon successful completion, the corresponding entry in the DB_MB is removed. It is possible that the write operation will fail when the mirror is compromised. This is discussed in more detail below.

The length of this write queue, when combined with the length of the read queue for initial synchronization, may provide information concerning synchronization of two sites. These lengths may be periodically recorded in a mesh status key in the configuration space.

Asynchronous Data Object Write Operations

Figure 6:
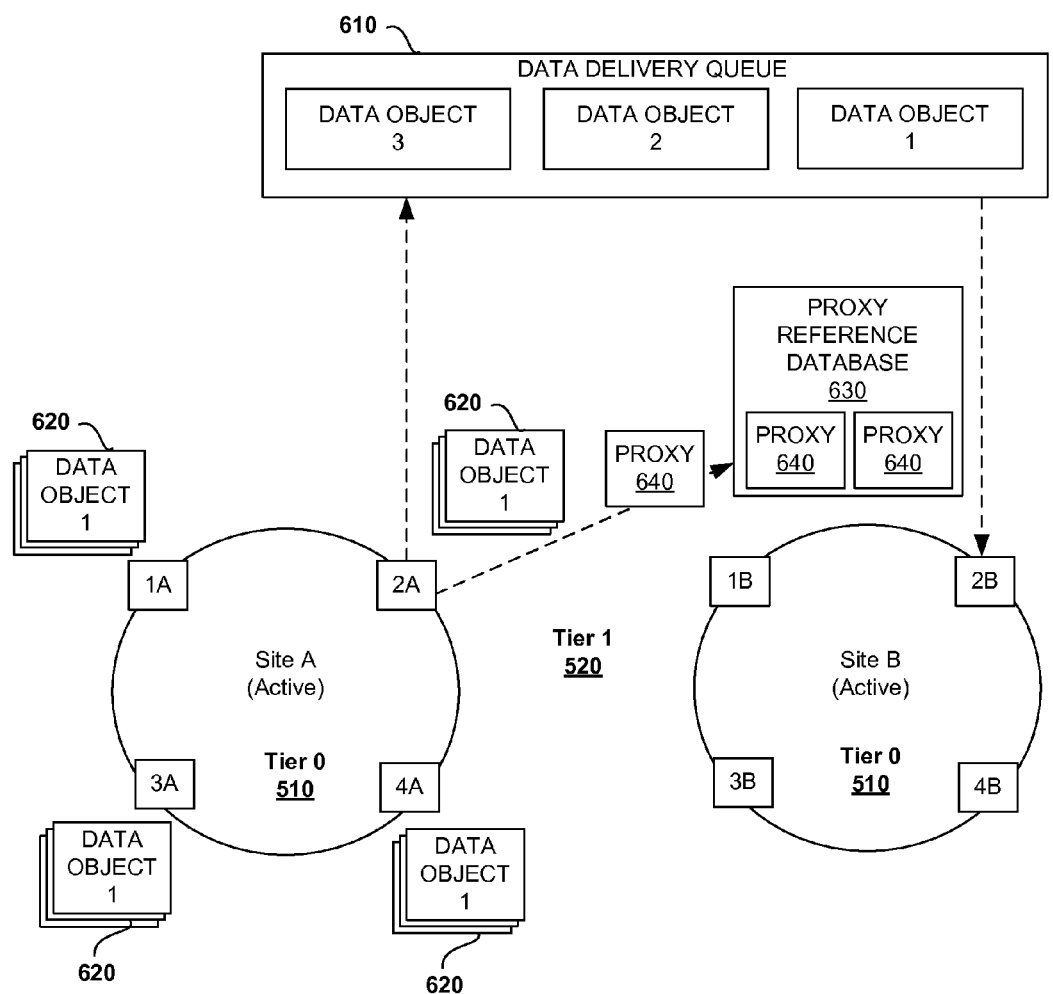
FIG. 6 shows a graphical representation of data replication between sites.

When write operations within a site, for example, site A as shown by FIG. 6, for data objects 620 are successfully completed at tier 0 510, the operations may be promoted at inter-site level to tier 1 520. For this purpose, proxy 640 associated with the data objects 620 of the update operations may be synchronously sent to the other site. The proxy 640 may include a site identification (ID) identifying the site that currently contains the data object, with which the proxy 640 is associated.

On receiving the proxy 640, proxy reference database 630 of site B may be updated. Thus, proxy references may be created informing site B about the data objects 620 that will be transferred.

When a data delivery queue 610 allows, the data objects 620 may be compressed and sent to site B. Data objects 620 may be transferred asynchronously. After receiving the data objects 620 in site B, data objects 620 may be decompressed and written to nodes of site B.

After the update operation in all tiers is successfully completed, the proxy object info 640 in proxy reference database 630 may be removed.

Data Object Read Operations

When a read operation for a data object is initiated, the data object may be searched for at tier 0 510. If the data object is found at tier 0 510, then the read operation is successfully completed. However, if the data object is not written in the site yet, the data object will not be found, so the read operation may be retried to tier 1. This process may repeat until either the object is found or all tiers are exhausted. In the latter case, the object cannot be found so an error is returned.

Referring to FIG. 6, if the read operation is associated with data object 2, a proxy reference related to data object 2 may be found in proxy reference database 630. Then, a request may be issued at tier 1 and data object 2 may be pulled forward and written to site B.

In some embodiments, data objects may be associated with object identifiers. An object identifier may uniquely identify a data object based on the content of the data object. Thus, a data object may be found in any location, at any tier using the object identifier, despite replication policies local to a site that involve dynamically relocating data replicas within a site.

Site Failure Scenarios

In some cases, one of the sites may experience a failure due to various reasons (for example, a power outage). If a remote site fails, a new remote site may be provisioned, and after establishing a connection, an initial synchronization may be initiated. If the site hosting the MOP fails, the system for remote replication may designate a new site to host the MOP.

Figure 7A:
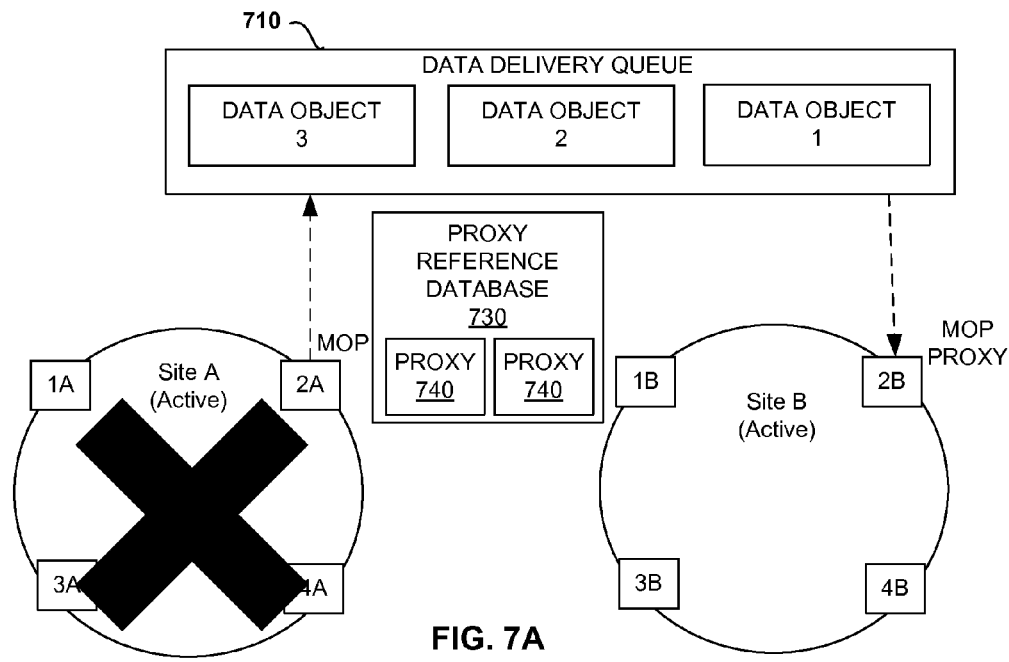
FIG. 7A shows a site failure.
Figure 7B:
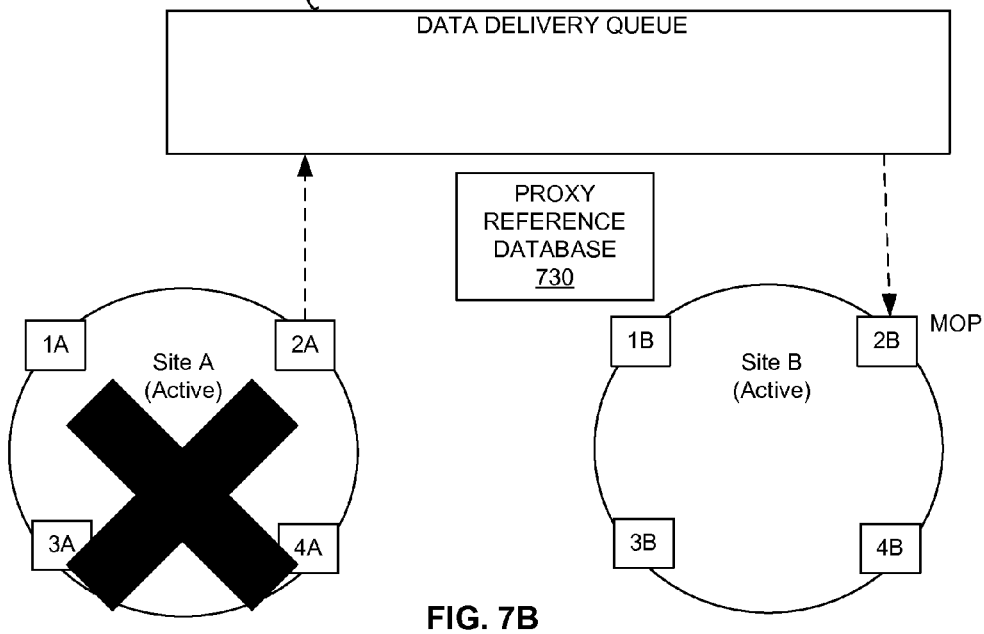
FIG. 7B shows actions taken upon the site failure.

FIG. 7A illustrates a failure of a site hosting MOP, in accordance with some example embodiments. Site A is the site hosting MOP, and site B is a site hosting a MOP proxy. The sites are in the process of data delivery. Data delivery queue 710 contains data objects, and proxy reference database 730 has some proxies 740. If site A fails, the system for replication between data sites may promote site B to be a site hosting the MOP as shown in FIG. 7B.

If site A fails, proxy reference database 730 has proxies, so the system for replication between data sites may perform a rollback. The system may scan the database and roll back to a snapshot that will support the data that was written in site B.

Other actions may include emptying data delivery queue 710, removing proxies from proxy reference database 730, and so forth.

If site A fails and subsequently recovers (e.g., recovering from a temporary power outage), it may be demoted to a site running a MOP proxy. When the connection between the sites is established, an initial synchronization procedure may be initiated. Thus, access to data residing on site A will not be lost.

Figure 8:
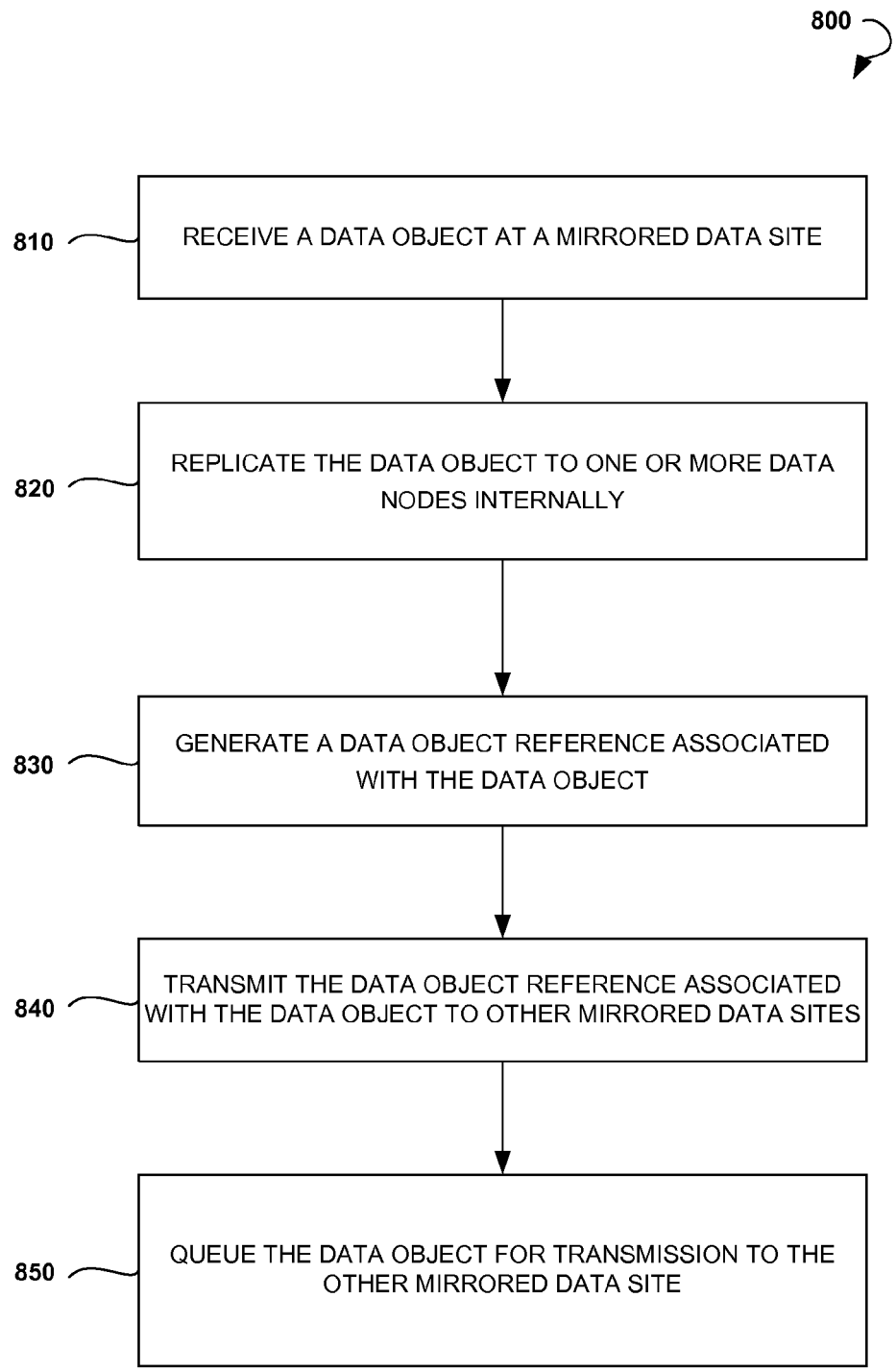
FIG. 8 is a flow chart illustrating a method for replication of data.

FIG. 8 is a process flow diagram showing a method 800 for replication of data between mirrored data sites within a computer network infrastructure 100. The method 800 may be performed by logic that may comprise hardware (e.g., dedicated logic, programmable logic, and microcode), software (such as software run on a general-purpose computer system or a dedicated machine), or a combination of both. In one exemplary embodiment, the processing logic resides at a system for replication between data sites 900, and the various elements of the system 900 can perform the method 800.

It will be appreciated by one of ordinary skill in the art that examples of the foregoing modules may be virtual, and instructions said to be executed by a module may, in fact, be retrieved and executed by the system 900. Although various elements may be configured to perform some or all of the various operations described herein, fewer or more elements may be provided and still fall within the scope of various embodiments.

As shown in FIG. 8, the method 800 may commence at operation 810 with receiving a data object at a mirrored data site. The data site may include one or more data nodes. One of these data nodes may be designated as the node running MOP, that is, an arbitrator node to arbitrate data replications between sites. The received data object may be replicated to the one or more data nodes internally at operation 820. After the data object is replicated to all data nodes, a data object reference associated with the data object may be generated at operation 830.

In some embodiments, an object identifier may be generated by running a cryptographic hash function over a content associated with the data object. Thereafter, the data object may be found based on the content associated with the data object.

At operation 840, the data object reference may be transmitted to one or more of other mirrored data sites including one or more nodes. Each of these nodes may be interconnected with each node in the other mirrored data sites to form a complete mesh. In some example embodiments, the data object reference may be transmitted to a data object reference database associated with the other mirrored data site. Then, the data object may be queued for transmission to the other mirrored data site at operation 850.

Upon transmission of the data object to the other mirrored data site, the data object may be replicated to one or more nodes of that data site. After completion of replication of the data object to the mirrored data site, the data object reference may be discarded.

In some embodiments, replication of the data object to the nodes within a mirrored data site may be performed at an intra-site operation tier, whereas transmitting the data object reference and the data object between mirrored data sites may be performed at an inter-site operation tier. Operations at both operation tiers may be performed using the same data logic.

Additionally, the method 800 may optionally comprise synchronizing data between mirrored data sites. The synchronizing may include comparing data object references and data objects associated with the mirrored data site internally to data object references and data objects associated with one or more of the other mirrored data sites. Delivery of the data objects corresponding to the object references may be requested.

In some embodiments, the method 800 may optionally comprise receiving a request for the data object at the other mirrored data site. If that site does not have the requested data object, it may be determined based on the data object reference associated with the other mirrored data site. In this case, the mirrored data site may be requested to serve the data object at a higher priority.

Figure 9:
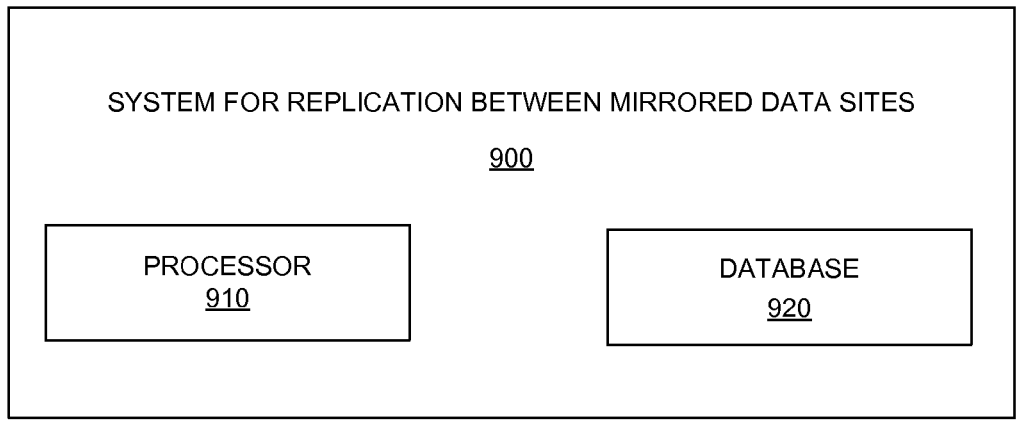
FIG. 9 shows a sample system for replication of data.

FIG. 9 shows a system for replication between data sites 900, in accordance with some example embodiments. The system 900 may include a processor 910 and a database 920. The processor 910 may be configured to receive a data object at a mirrored data site. That data site may include one or more data nodes, and the received data object may be replicated to the one or more data nodes internally, at a local tier. Then, a data object reference, for example, a proxy reference, associated with the data object may be generated and transmitted to the database 920. The database 920 may include a data object reference, which in some embodiments is referred to as a "proxy reference" that identifies the site in which the data resides.

The data object may be then queued for a transmission to one or more of the other mirrored data sites. Upon the transmission of the data object to the one or more of the other mirrored data sites, the data object may be replicated to the nodes of the one or more of the other mirrored data sites and the data object reference may be discarded.

Figure 10:
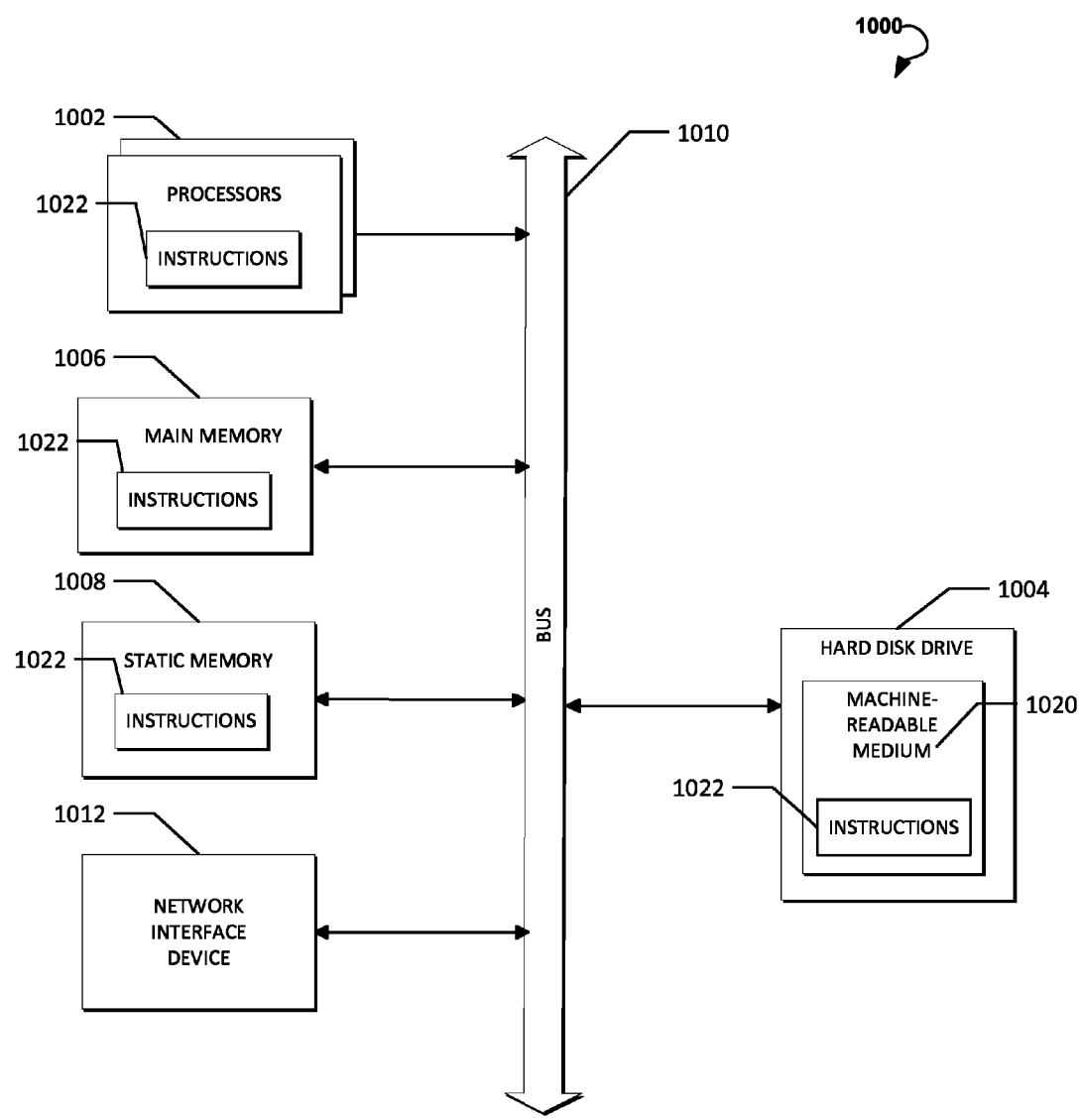
FIG. 10 shows a diagrammatic representation of a computing device in the exemplary electronic form of a computer system.

FIG. 10 shows a diagrammatic representation of a computing device for a machine in the exemplary electronic form of a computer system 1000, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor or multiple processors 1002, a hard disk drive 1004, a main memory 1006 and a static memory 1008, which communicate with each other via a bus 1010. The computer system 1000 may also include a network interface device 1012, and coprocessors dedicated for data compression and object identifier cryptographic calculation. The hard disk drive 1004 may include a computer-readable medium 1020, which stores one or more sets of instructions 1022 embodying or utilized by any one or more of the methodologies or functions described herein. The instructions 1022 can also reside, completely or at least partially, within the main memory 1006 and/or within the processors 1002 during execution thereof by the computer system 1000. The main memory 1006 and the processors 1002 also constitute machine-readable media such as, for example, an HDD or SSD.

While the computer-readable medium 1020 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, RAM, ROM, HDD, SSD, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, C++, C# or other compilers, assemblers, interpreters or other computer languages or platforms.

Thus, computer-implemented methods and systems for replication of data between mirrored data sites are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:
1. A method for replication of data between mirrored data sites, the method comprising:
receiving a data object at a first mirrored data site including one or more data nodes;
replicating the data object to the one or more data nodes internally within the first mirrored data site;
generating a data object reference indicating a forthcoming transmission of the data object to a second mirrored data site, wherein the data object reference includes an identification of the first mirrored data site, which stores one or more replicas of the data object;
transmitting the data object reference to a proxy reference database; and
queuing the data object referred to by the data object reference in a data delivery queue for the forthcoming transmission to the second mirrored data site, wherein upon transmission of the data object referred to by the data object reference to the second mirrored data site, the data object is replicated to one or more data nodes associated with the second mirrored data site; and
discarding the data object reference from the proxy reference database in response to the data object being successfully written to the second mirrored data site; and
receiving at the second mirrored data site, a request for the data object;

determining, based on the data object reference in the proxy reference database, that the data object has not been received by the second mirrored data site; and based on the determination, requesting the first mirrored data site referred to by the data object reference in the proxy reference database to serve the data object.

2. The method of claim 1, further comprising retrying the data object for transmission when the data object cannot be immediately written to the nodes within the second mirrored data site due to current storage capacity constraints, wherein the data object reference is not discarded until available capacity is realized in the second mirrored data site.

3. The method of claim 1, wherein the data object reference is generated by running a cryptographic hash function over a content associated with the data object.

4. The method of claim 3, wherein the data object reference allows finding the data object based on the content associated with the data object.

5. The method of claim 1, wherein the first mirrored data site and the second mirrored data site support an intra-site tier operation and an inter-site tier operation using the same data logic, the replicating of the data object to the one or more data nodes being performed by selecting the intra-site tier operation, and the replicating of the data object to the one or more data nodes in the second mirrored data site being performed by specifying the inter-site operation.

6. The method of claim 1, further comprising synchronizing mirrored data sites, the synchronizing including:
    comparing one or more data object references and data objects associated with the first mirrored data site to one or more data object references in the second mirrored data site and data objects associated with the second mirrored data site; and
    requesting deliveries of the one or more data objects corresponding to the one or more data object references.

7. The method of claim 1, wherein the mirrored data sites provide a consistent view of a file system.

8. The method of claim 1, wherein each node in the first mirrored data site and in the second mirrored data sites are interconnected to form a complete mesh.

9. The method of claim 1, wherein one data site includes an arbitrator node to arbitrate data replications between the mirrored data sites.

10. The method of claim 9, wherein upon failure of a node hosting a Metadata Operational Processor (MOP), another node in that site is designated as the arbitrator node.

11. The method of claim 10, wherein each mirrored data site includes respective gateway nodes configured to establish a gateway between the mirrored data sites.

12. The method of claim 11, wherein upon a failure of one of the gateway nodes, an alternate gateway node is designated, the alternate gateway node using a pre-provisioned path to establish an alternate gateway between the mirrored data sites.

13. A system for replication between mirrored data sites, the system comprising:
    a proxy reference database configured to store one or more data object references associated with one or more data objects;
    a processor configured to:
        receive a data object at a first mirrored data site including one or more data nodes;
        replicate the data object to the one or more data nodes internally within the first mirrored data site;
        generate a data object reference indicating a forthcoming transmission of the data object to a second mirrored data site, wherein the data object reference includes an identification of the first mirrored data site, which stores one or more replicas of the data object;
        transmit the data object reference to the proxy reference database, wherein the proxy reference database is associated with the second mirrored data site, the first mirrored data site and the second mirrored data site having one or more pre-provisioned interconnections; and
        queue the data object referred to by the data object reference in a data delivery queue for the forthcoming transmission to the second mirrored data site, wherein upon transmission of the data object referred to by the data object reference to the second mirrored data site, the data object reference is discarded from the proxy reference database in response to the data object being successfully written to the second mirrored data site; and
        receive at the second mirrored data site, a request for the data object;
        determine, based on the data object reference in the proxy reference database, that the data object has not been received by the second mirrored data site; and
        based on the determination, request the first mirrored data site referred to by the data object reference in the proxy reference database to serve the data object.

14. The system of claim 13, wherein the data object reference is generated by running a cryptographic hash function over a content associated with the data object.

15. The system of claim 14, wherein the data object reference allows finding the data object based on the content associated with the data object.

16. The system of claim 13, wherein the first mirrored data site and the second mirrored data sites support an intra-site tier operation and an inter-site tier operation using the same data logic, the replicating of the data object to the one or more data nodes being performed by selecting the intra-site tier operation and the replicating of the data object to the one or more data nodes in the second mirrored data sites being performed by selecting the inter-site tier operation.

17. The system of claim 13, wherein the processor is further configured to synchronize the first mirrored data site and the second mirrored data site, the synchronizing including:
    comparing one or more data object references and data objects associated with one of the mirrored data sites to one or more data object references and data objects associated with the other mirrored data site; and
    requesting deliveries of the one or more data objects corresponding to the one or more data object references.

18. The system of claim 13, wherein one of the mirrored data sites includes an arbitrator node to arbitrate data replications between all mirrored data sites.

19. A non-transitory processor-readable medium having instructions stored thereon, which when executed by one or more processors, causes the one or more processors to:
    receive a data object at a first mirrored data site including one or more data nodes;
    replicate the data object to the one or more data nodes internally within the first mirrored data site;
    generate a data object reference indicating a forthcoming transmission of the data object to a second mirrored data site, wherein the data object reference includes an identification of the first mirrored data site, which stores one or more replicas of the data object;
transmit the data object reference to a proxy reference database; and
queue the data object referred to by the data object reference in a data delivery queue for the forthcoming transmission to the second mirrored data site, wherein upon transmission of the data object referred to by the data object reference to the second mirrored data site, the data object is replicated to one or more data nodes associated with the second mirrored data site; and
discard the data object reference from the proxy reference database in response to the data object being successfully written to the second mirrored data site; and
receive at the second mirrored data site, a request for the data object;
determine, based on the data object reference in the proxy reference database, that the data object has not been received by the second mirrored data site; and
based on the determination, request the first mirrored data site referred to by the data object reference in the proxy reference database to serve the data object.

\* \* \* \* \*